Patented Oct. 20, 1953

2,656,394

UNITED STATES PATENT OFFICE 2,656,394

OXIDATION OF A NAPHTHYL DIALKYL METHINE

George G. Joris, Madison, and William D. Griffin, Morristown, N. J., assignors to Allied Chemical & Dye Corporation, New York, N. Y., a corporation of New York No Drawing. Application June 23, 1951, Serial No. 233,246

3 Claims. (Cl. 260—610)

This invention relates to oxidation of a naphthyl dialkyl methine to the corresponding methine hydroperoxide, i. e. oxidation of a hydrocarbon of the formula

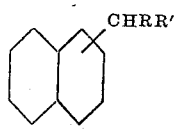

to a hydroperoxide of the formula

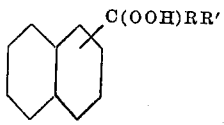

where R and R' represent alkyl radicals, the same or different, such as methyl, ethyl, etc.

In particular, our invention relates to oxidation of the lower ($C_3$–$C_8$ alkyl group) alpha- and beta-alkyl naphthalenes of the above structure, such as alpha- and beta-isopropyl naphthalene. The discussion which follows refers specifically to isopropyl naphthalenes, but it is to be understood that such reference is by way of illustration only and that our invention is not limited thereto, but includes oxidation of naphthyl dialkyl methines generally, including sec. butyl, sec. amyl, sec. hexyl, sec. heptyl, sec. octyl, etc. naphthalenes.

Oxidation of alkyl naphthalenes to the corresponding hydroperoxides is of technical interest because among other reasons these hydroperoxides are convertible to valuable products including naphthols and other useful products. Formation of the hydroperoxides by oxidation of the appropriate alkyl naphthalene proves difficult, however. So far as we are aware, the process of the present invention is the first known process to form desired hydroperoxides without large proportions of by-product.

The difficulties in forming hydroperoxides of alkyl naphthalenes are apparently connected with a marked instability of these hydroperoxides, which decompose under usual reaction conditions and form by-products, oxidation inhibiting products, etc. For example, oxidation of isopropyl naphthalene in presence of even very small quantities, less than 1% by weight, of known heavy metal oxidation catalysts such as manganese naphthenate has been stated to form, even at relatively low temperatures such as 45° C., more by-product than hydroperoxide at least when hydroperoxide concentrations reach as much as about 20–22% by weight of the reaction mixture.

We have now found that high yields of the corresponding methine hydroperoxide are obtained upon oxidation of a naphthyl dialkyl methine such as beta-isopropyl naphthalene in liquid phase in presence of specifically lead dioxide catalyst employing elemental oxygen, e. g. oxygen of air, as oxidizing agent. The following example is illustrative of our invention, but our invention is not limited thereto.

*Example.*—Beta - isopropyl naphthalene was prepared by alkylation of naphthalene at 80° C. with isopropyl chloride in the presence of aluminum chloride catalyst, and was treated before oxidation by decolorizing with charcoal and contacting with alkali pellets over which it was stored until withdrawn for use.

Air was bubbled through the isopropyl naphthalene thus prepared, in which was suspended about 1% by weight of lead dioxide powder, in a reaction vessel at 40° C. at a rate of 10 liters of air per hour per 15 cc. of reaction mixture. Dispersion of the catalyst was maintained by the air bubbles. Oxidation proceeded at a rate of about 0.18 weight percent of hydroperoxide formed in the reaction mixture per hour until about 13 weight percent hydroperoxide concentration was reached. Thereafter oxidation rates fell slowly.

Up to concentration of about 17 weight percent hydroperoxide in the reaction mixture, hydroperoxide was the only product detectable by infra red spectrographic analysis. Thereafter small amounts of ketone were formed, about 2 weight percent of ketone at 20 weight percent hydroperoxide concentration and 4 weight percent of ketone at 22 weight percent hydroperoxide concentration.

When temperatures about 75° C. were used under otherwise the conditions above described, considerably larger proportions of ketone were formed but the proportions of hydroperoxide obtained still exceeded the proportions of ketone obtained.

Suitable temperatures for oxidations by our process are usually between about room temperatures (25° C.) and about 75° C., optimum temperatures for oxidation of beta-isopropyl naphthalene being about 40° C. Optimum temperatures with other alkyl naphthalenes depend upon the ease of oxidizing these and the stability of the hydroperoxide products; they lie between the reaction temperature of the hydrocarbon and the decomposition temperature of the hydroperoxide in solution in the hydrocarbon, which temperatures can readily be ascertained for any particular case by routine experiments.

Suitable quantities of catalyst are in the usual ranges for catalyst materials, e. g. between about 0.1% and about 10% by weight. Larger amounts can be used if desired.

Pressures can be atmospheric or higher if desired. Suitable sources of elemental oxygen include purified oxygen, air, off gases from an oxidation stage employing the present process, etc.

Continuous operation can be employed, e. g. a reaction mixture can be maintained at hydroperoxide concentrations corresponding to maximum reaction rates, such as 10-15 weight percent hydroperoxide concentrations, by continuous withdrawal of reaction mixture and replacement thereof with fresh and/or recycled hydrocarbon and catalyst.

We claim:

1. Process of oxidizing a naphthyl dialkyl methine to the corresponding methine hydroperoxide, which process comprises contacting said methine in liquid phase with elemental oxygen in presence of lead dioxide catalyst, and terminating the oxidation and recovering products at a stage when analysis of the products shows hydroperoxide preponderating heavily over by-products.

2. Process as defined in claim 1, wherein hydrocarbon oxidized is beta-isopropyl naphthalene, air is the source of elemental oxygen, and temperatures are between about room temperatures and about 75° C.

3. Process as defined in claim 2, wherein temperatures are about 40° C. and quantities of catalyst are about 1% by weight of the reaction mixture.

GEORGE G. JORIS.
WILLIAM D. GRIFFIN.

References Cited in the file of this patent

UNITED STATES PATENTS

| Number | Name | Date |
|---|---|---|
| 1,924,786 | Hartmann et al. | Aug. 29, 1933 |
| 2,475,605 | Prutton et al. | July 12, 1949 |
| 2,548,435 | Lorand et al. | Apr. 10, 1951 |